US010657293B1

(12) United States Patent
Wei et al.

(10) Patent No.: US 10,657,293 B1
(45) Date of Patent: May 19, 2020

(54) FIELD-PROGRAMMABLE GATE ARRAY BASED TRUSTED EXECUTION ENVIRONMENT FOR USE IN A BLOCKCHAIN NETWORK

(71) Applicant: Alibaba Group Holding Limited, George Town (KY)

(72) Inventors: Changzheng Wei, Hangzhou (CN); Guozhen Pan, Hangzhou (CN); Ying Yan, Hangzhou (CN); Huabing Du, Hangzhou (CN); Boran Zhao, Hangzhou (CN); Xuyang Song, Hangzhou (CN); Yichen Tu, Hangzhou (CN); Ni Zhou, Hangzhou (CN); Jianguo Xu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,451

(22) Filed: Sep. 30, 2019

Related U.S. Application Data

(63) Continuation of application No. PCT/CN2019/079705, filed on Mar. 26, 2019.

(51) Int. Cl.
*H04L 29/06* (2006.01)
*G06F 21/76* (2013.01)
(Continued)

(52) U.S. Cl.
CPC .............. *G06F 21/76* (2013.01); *G06F 9/455* (2013.01); *H04L 9/0819* (2013.01);
(Continued)

(58) Field of Classification Search
CPC ..... H04L 2209/38; H04L 22/09; H04L 22/56; H04L 9/0637; G06Q 2220/00
See application file for complete search history.

(56) References Cited

U.S. PATENT DOCUMENTS

2017/0337534 A1* 11/2017 Goeringer ............. H04L 9/3239
2018/0096121 A1*  4/2018 Goeringer ............... G06F 21/32
2018/0183587 A1*  6/2018 Won ........................ G06F 21/44

FOREIGN PATENT DOCUMENTS

CN         108055125        5/2018
WO     WO 2014142858        9/2014
(Continued)

OTHER PUBLICATIONS

Wikipedia [online], "Trusted execution environment," retrieved on Nov. 26, 2019, retrieved from URL<https://en.wikipedia.org/wiki/Trusted_execution_environment>, 6 pages.
(Continued)

*Primary Examiner* — Jason K Gee
(74) *Attorney, Agent, or Firm* — Fish & Richardson P.C.

(57) ABSTRACT

Disclosed herein are methods, systems, and apparatus, including computer programs encoded on computer storage media, for configuring a field programmable gate array (FPGA) based trusted execution environment (TEE) for use in a blockchain network. One of the methods includes storing a device identifier (ID), a first random number, and a first encryption key in a field programmable gate array (FPGA) device; sending an encrypted bitstream to the FPGA device, wherein the encrypted bitstream can be decrypted by the first key into a decrypted bitstream comprising a second random number; receiving an encrypted message from the FPGA device; decrypting the encrypted message from the FPGA device using a third key to produce a decrypted message; in response to decrypting the encrypted message: determining a third random number in the decrypted message; encrypting keys using the third random number; and sending the keys to the FPGA device.

24 Claims, 6 Drawing Sheets

(51) Int. Cl.
  *H04L 9/08* (2006.01)
  *G06F 9/455* (2018.01)
  *H04L 9/06* (2006.01)
(52) U.S. Cl.
  CPC .......... *H04L 9/0866* (2013.01); *H04L 9/0869* (2013.01); *H04L 9/0897* (2013.01); *H04L 9/0643* (2013.01); *H04L 2209/38* (2013.01)

(56) References Cited

FOREIGN PATENT DOCUMENTS

| WO | WO 2016209569 | 12/2016 |
| WO | WO 2018058441 | 4/2018 |
| WO | WO 2018140169 | 8/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/079705, dated Jan. 2, 2020, 7 pages.

* cited by examiner

FIELD-PROGRAMMABLE GATE ARRAY BASED TRUSTED EXECUTION ENVIRONMENT FOR USE IN A BLOCKCHAIN NETWORK

CROSS-REFERENCE TO RELATED APPLICATIONS

This application is a continuation of PCT Application No. PCT/CN2019/079705, filed on Mar. 26, 2019, which is hereby incorporated by reference in its entirety.

TECHNICAL FIELD

This specification relates to configuring a field-programmable gate array (FPGA) based trusted execution environment (TEE) for executing a blockchain contract virtual machine.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A node in a blockchain network runs one or more programs, e.g., a blockchain virtual machine, for executing blockchain-related tasks. Examples of blockchain-related tasks include querying an account's balance, deploying a smart contract, verifying a new blockchain transaction, and so on.

A field-programmable gate array (FPGA) is an integrated circuit capable of being configured to perform different logic functions. An FPGA contains an array of programmable logic blocks and interconnects that can be used to wire the logic blocks in different configurations. An FPGA bitstream is a file that contains the programming information for an FPGA.

Some modern processors include a trusted execution environment (TEE) functionality. A TEE is a secured hardware environment that protects software code executing on a processor from unauthorized modification. A TEE provides an isolated enclave to prevent outside processes (e.g., an operation system, external actors, etc.) from altering any data or software code executing inside the enclave. TEE's also generally include a mechanism for verifying that the software code executing on the processor, or, in some cases, the data associated with the executing software, has not been modified. One example of a TEE implementation is Intel's CPU-based SGX® technology, which relies on a centralized trust authority operated by Intel.

It would be desirable to allow developers to implement their own trust mechanisms without involving an external entity.

SUMMARY

This specification describes technologies for enhancing data and code security on a blockchain node. These technologies generally involve configuring an FPGA-based TEE for running blockchain-related programs on a blockchain node.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

BRIEF DESCRIPTION OF DRAWINGS

Like reference symbols in the various drawings indicate like elements.

DETAILED DESCRIPTION

Figure 1:
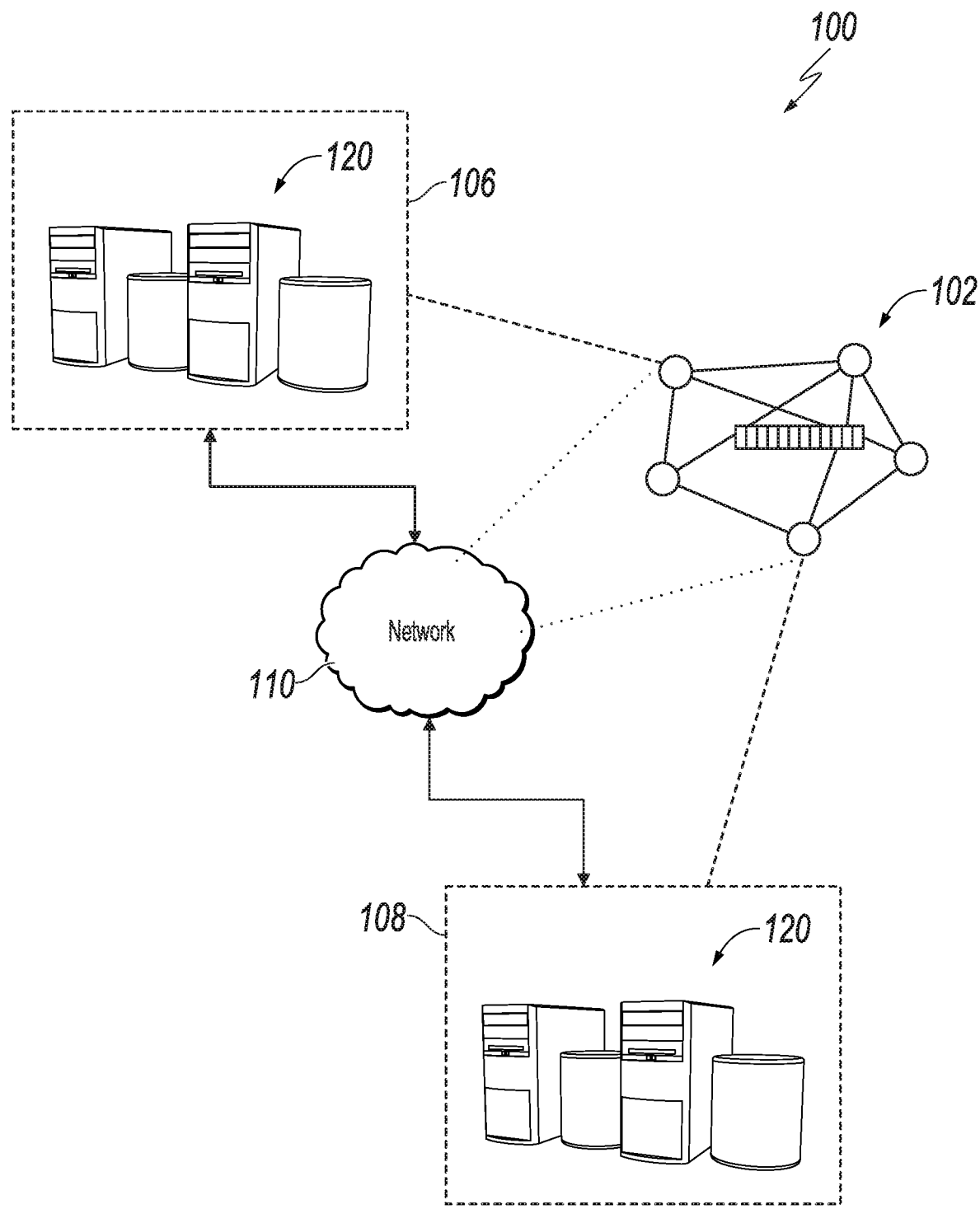
FIG. 1 is a diagram illustrating an example of an environment that can be used to execute implementations of this specification.

This specification describes technologies for enhancing data and code security on a blockchain node. These technologies generally involve configuring an FPGA-based TEE for running blockchain-related programs on a blockchain node.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
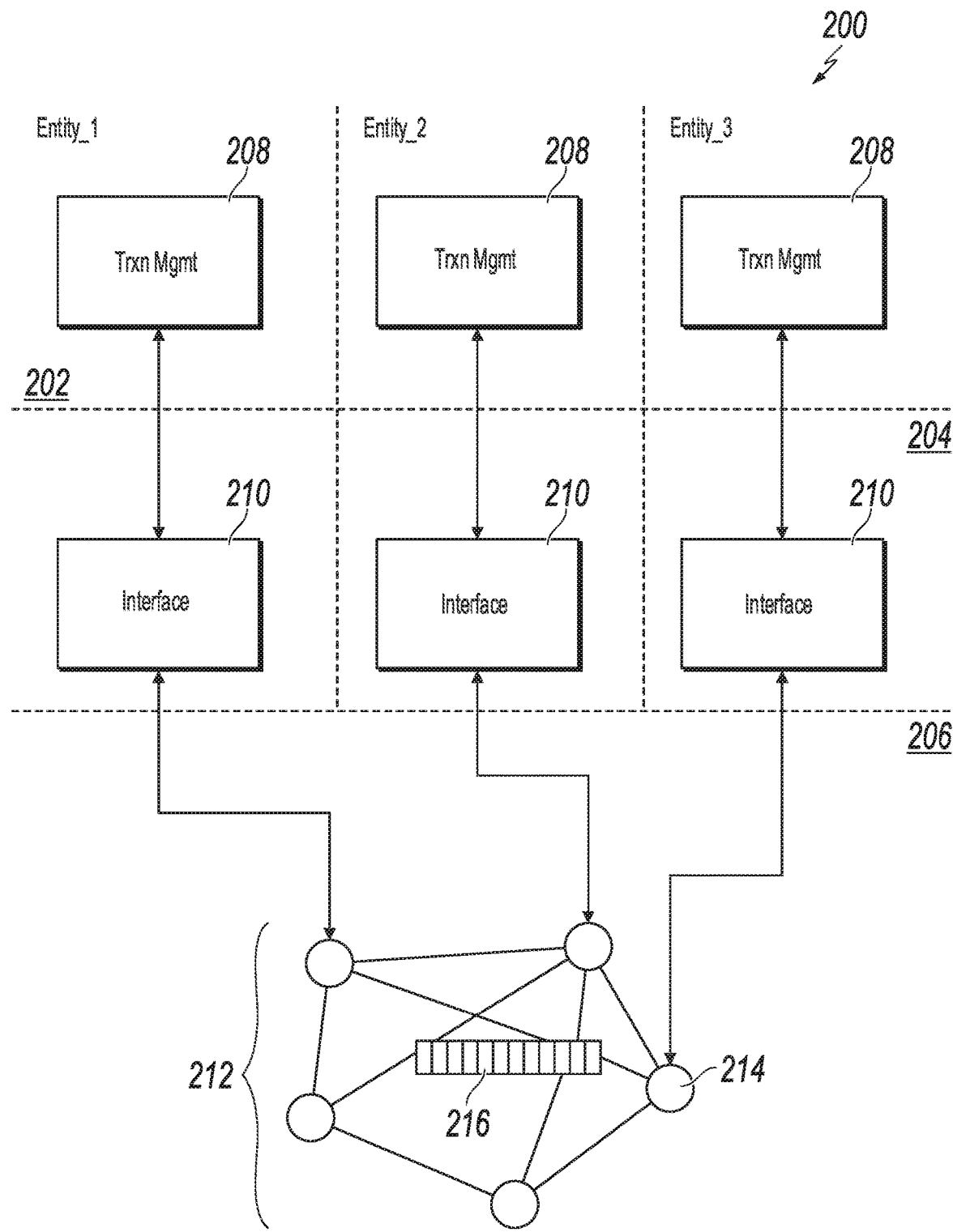
FIG. 2 is a diagram illustrating an example of an architecture in accordance with implementations of this specification.

FIG. 2 depicts an example of an architecture 200 in accordance with embodiments of this specification. The architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

[This and the next two paragraphs are a general encryption discussion—keep, enhance or remove based on the specifics of the invention]. In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
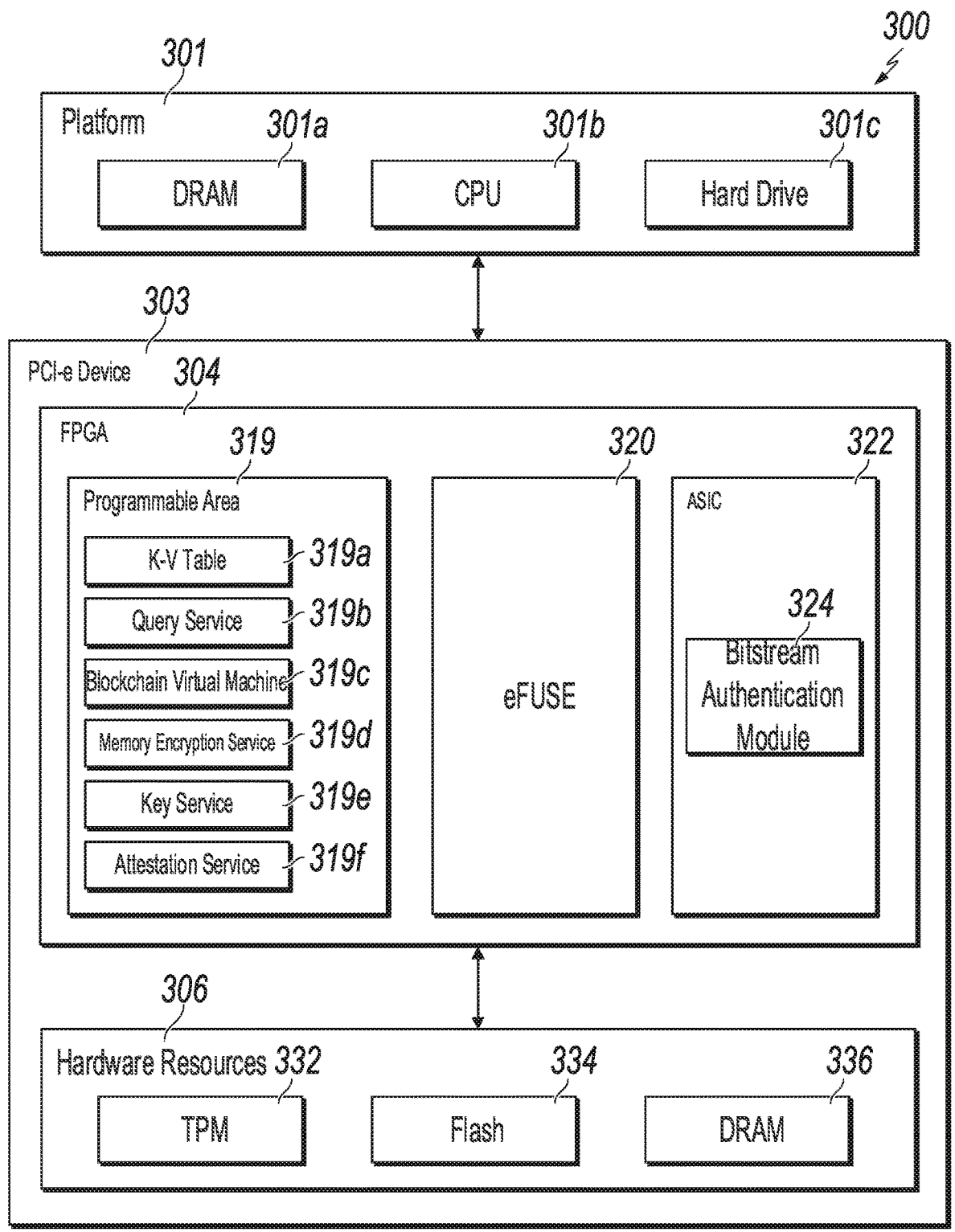
FIG. 3 depicts an example of a blockchain node having an FPGA-based TEE in accordance with implementations of this specification.

FIG. 3 depicts an example of a blockchain node 300 having an FPGA-based trusted execution environment (TEE) in accordance with implementations of this specification. The blockchain node 300 is one of a plurality of nodes of a blockchain network, e.g., the blockchain network 212 of FIG. 2. In some cases, the blockchain node 300 is capable of storing blockchain information and executing blockchain-related tasks such as smart contracts.

In some implementations, the blockchain node 300 includes a platform 301 communicably coupled to a Peripheral Component Interconnect Express (PCI-e) device 303. The platform 301 is capable of performing generic computing tasks and includes computer hardware such as a DRAM 301a, a CPU 301b, and a hard drive 301c. In one example, the platform 301 can be a server, a personal computer, a tablet computer, and so on.

In some implementations, to enhance data and code security, the blockchain node 300 performs blockchain-related tasks in a TEE. As a result, unauthorized programs and devices, e.g., the platform 301's operation system, are prohibited from accessing and altering blockchain-related information on the blockchain node 300, as well as software code executing in the TEE.

In some implementations, to implement an FPGA-based TEE on the blockchain node 300, the platform 301 is communicably coupled to a PCI-e device 303. The PCI-e device 303 includes an FPGA 304 and additional hardware resources 306 necessary for implementing the TEE. The FPGA 304 is a programmable integrated circuit capable of being configured to perform specific logic functions. The FPGA 304 includes a programmable area 319, an eFUSE 320, and an ASIC area 322. The programmable area 319 includes an array of programmable blocks that can be wired together to perform complex combinational functions. The FPGA 304 can be programmed by loading an FPGA bitstream into the programmable area 319. For example, an FPGA bitstream can include instructions for creating a TEE in the programmable area 319. The eFUSE 320 is a one-time programmable area including an array of fuse links, where each fuse link can be burnt to store a bit. As a result, unlike the programmable area 319, the eFUSE 320 cannot be reprogrammed once having been written to. For example, the eFUSE 320 can store information that is unique to the FPGA 304 such as a unique device ID. The ASIC area 322 is a fixed-logic area that is not reprogrammable by an FPGA bitstream. The ASIC area 322 can store programs that support the functioning of the FPGA 304. In one example, the ASIC area 322 can store a bitstream authentication module 324 that authenticates a newly-loaded FPGA bitstream.

In some implementations, the FPGA 304 is coupled to additional hardware resource 306 on the PCI-e device. For example, the FPGA 304 can interface with a trusted platform module (TPM) 332, a flash 334, and a DRAM 336.

In some implementations, to provide the "execution" aspect of the TEE, the FPGA 304 is programmed to run at least a K-V (key value pair) table 319a, a query service 319b, and a blockchain virtual machine 319c. The K-V table 319a is a cache that stores blockchain information locally on the FPGA 304. The query service 319b is a program responsible for answering queries submitted to the blockchain. Examples of blockchain queries include querying past transactions, account balance, and so on. The blockchain virtual machine 319c is a program responsible for executing blockchain-related tasks on the blockchain node 300. For example, the blockchain virtual machine 319c can execute smart contracts deployed on the blockchain network.

In some implementations, to provide the "trusted" aspect of the TEE, the FPGA 304 is programmed to run at least a memory encryption service 319d, a key service 319e, and an attestation service 319f. The memory encryption service 319d encodes critical information on the FPGA 304. The key service 319e is responsible for managing secret keys and using the secret keys to communicate with the blockchain. The attestation service 319f allows the FPGA 304 to prove to a remote device or user that the FPGA 304 can be trusted, e.g., by providing a bitstream measure report. Steps and methods for programming the FPGA 304 as a TEE is described with respect to FIG. 4 and the related description below.

Figure 4:
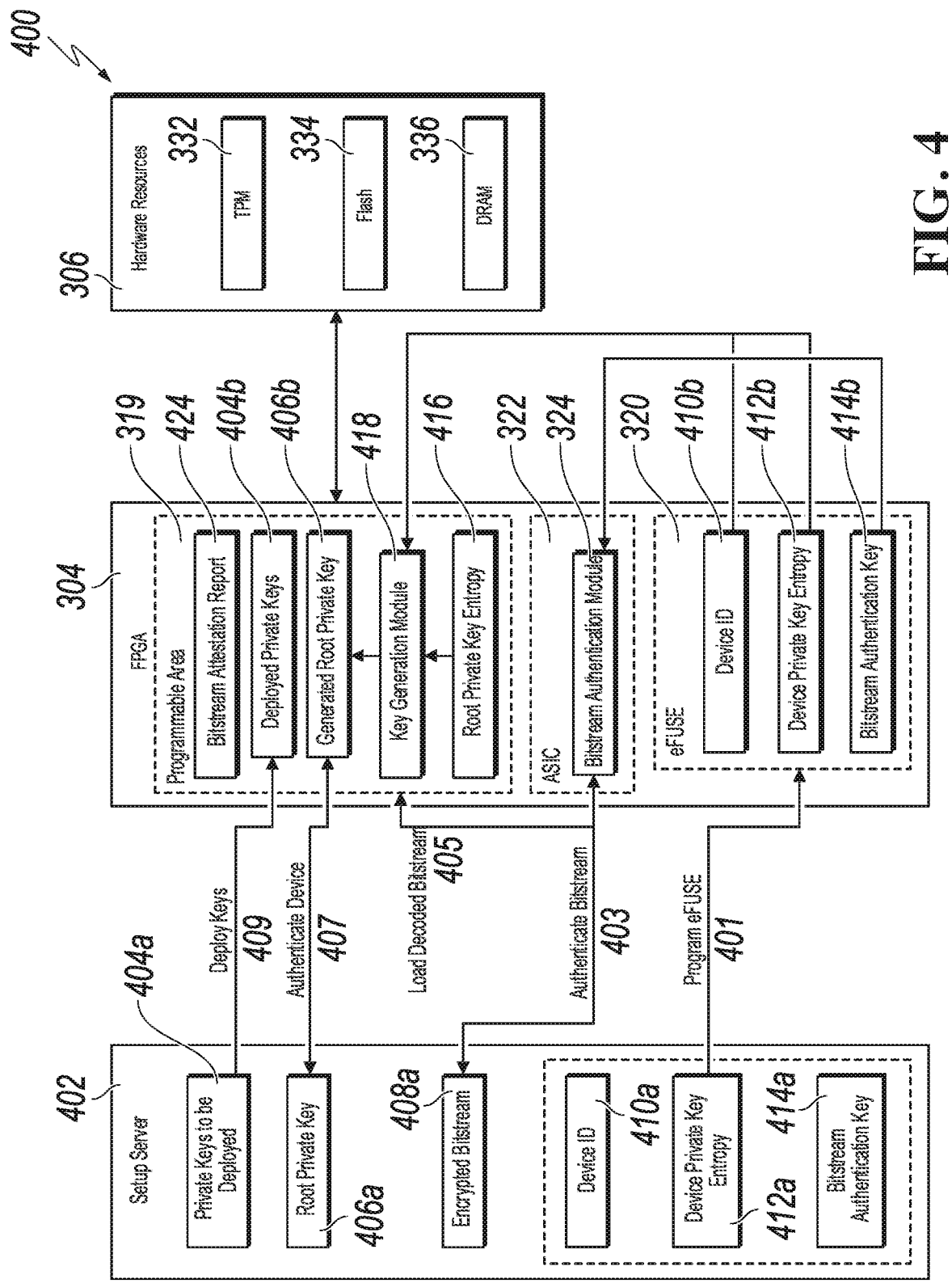
FIG. 4 depicts an example of a setup of an FPGA-based TEE in accordance with implementations of this specification.

FIG. 4 depicts an example of an FPGA-based TEE setup 400 in accordance with implementations of this specification. During the TEE setup 400, a setup server 402 exchanges information with the FPGA 304 to create an FPGA-based TEE. The aims of the TEE setup 400 are twofold: (1) the FPGA 304 is programmed to decode, authenticate, and install an encrypted bitstream 408a from the setup server 402; and (2) the setup server 402 is programmed to authenticate with the FPGA 304 and to send private keys to be deployed (404a) to the FPGA 304. Once receiving deployed private keys 404b, the key service 319e (FIG. 3) of the FPGA 304 manages those keys and use them to communicate with outside processes and devices. Unauthorized processes and devices, e.g., those without proper key information, are prevented from exchanging information with the FPGA 304. The programmable area 319 also includes one or more programs, e.g., programs 319a-319c of FIG. 3, for executing blockchain-related tasks. These programs form the "execution" aspect of the TEE.

In some implementations, at the beginning of the TEE setup 400, the setup server 402 stores all the necessary information for programming the FPGA 304 into a TEE. For example, the setup server 402 can store device information for the FPGA 304 including a device ID 410a, a device private key entropy 412a, and a bitstream authentication key 414a. The device ID 410a is a string that uniquely identifies the FPGA 304, the device private key entropy 412a is a randomly or pseudo-randomly generated string for the FPGA 304, and the bitstream authentication key 414a is a string for authenticating an encrypted bitstream 408a. A different FPGA device in the blockchain network will have a different set of device information. The setup server 402 can store the collection of device information in any suitable data structure, such as a key-value table.

The setup server 402 programs the device information into the eFUSE 320 (401). For example, the device information can be written to the eFUSE 320 using JTAG standard. As a result, the eFUSE 320 stores the corresponding device ID 410b, device private key entropy 412b, and bitstream authentication key 414b. Since the eFUSE 320 is only one-time programmable, the device information cannot be altered in the FPGA 304.

The setup server 402 next causes the encrypted bitstream 408a to be sent to the FPGA 304. The encrypted bitstream 408a is a file designed to configure the programmable area 319 to implement TEE functions. The encrypted bitstream 408a can be encoded using any suitable encryption schemes such as the advanced encryption standard (AES). The encrypted bitstream 408a can be deployed to different FPGA devices in the blockchain network.

Upon receiving the encrypted bitstream 408a, the FPGA 304 authenticates the encrypted bitstream 408a using the bitstream authentication key 414b stored in the eFUSE 320 (403). For example, the FPGA 304 can be programmed to use a dedicated bitstream authentication module 324 stored in the ASIC area 322 to perform the authentication. If the encrypted bitstream 408a is the correct bitstream for the FPGA 304, the authentication will succeed. As a result, the FPGA 304 decodes the encrypted bitstream 408*a* and loads the decoded bitstream to the programmable area 319 (405).

In some implementations, the decoded bitstream includes a key generation module 418 and a root private key entropy 416. The root private key entropy 416 is a randomly or pseudo-randomly generated string unique to the encrypted bitstream 408, and the key generation module 418 is a program that is designed to generate a root private key.

The key generation module 418 takes as inputs the root private key entropy 416, the device ID 410*b*, and the device private key entropy 412*b*, and outputs a generated root private key 406*b*. Although different FPGA devices have the same root private key entropy, the generated root private key 406*b* is unique to the FPGA 304 since the device ID 410*b* and the device private key entropy 412*b* are unique to the FPGA 304. In this way, the FPGA bitstream can be open-sourced and audited by the community, yet can still be used to create a TEE on the FPGA 304.

Next, the FPGA 304 encrypts a message with the generated root private key 406*b*, and sends the message to the setup server 402 (407). For example, the message can be a concatenation of the unique device ID 410*b* and a random number. The FPGA 304 can encode the message using any suitable encryption schemes, such as the AES or GCM.

Upon receiving the encrypted message from the FPGA 304, the setup server 402 decrypts the message and determines whether the generated root private key 406*b* is identical to the root private key 406*a* (407). If so, the setup server 402 encrypts private keys to be deployed 404*a* and sends the encrypted keys to the FPGA 304 (409). The FPGA 304 receives and stores the deployed private keys 404*b*. The deployed private keys 404*a* are keys responsible for exchanging information between the FPGA-based TEE and outside environments. For example, the deployed private keys 404*b* can include unseal private keys, sign private keys, and so on.

In some implementations, a remote user initiates an attestation request to verify the TEE environment. In response, the FPGA 304 prepares a bitstream attestation report and encrypts it with the deployed private keys 404*b* and sends it to the remote user. For example, the FPGA 304 can use the attestation service 319*f* (FIG. 3) to respond to the request.

Figure 5:
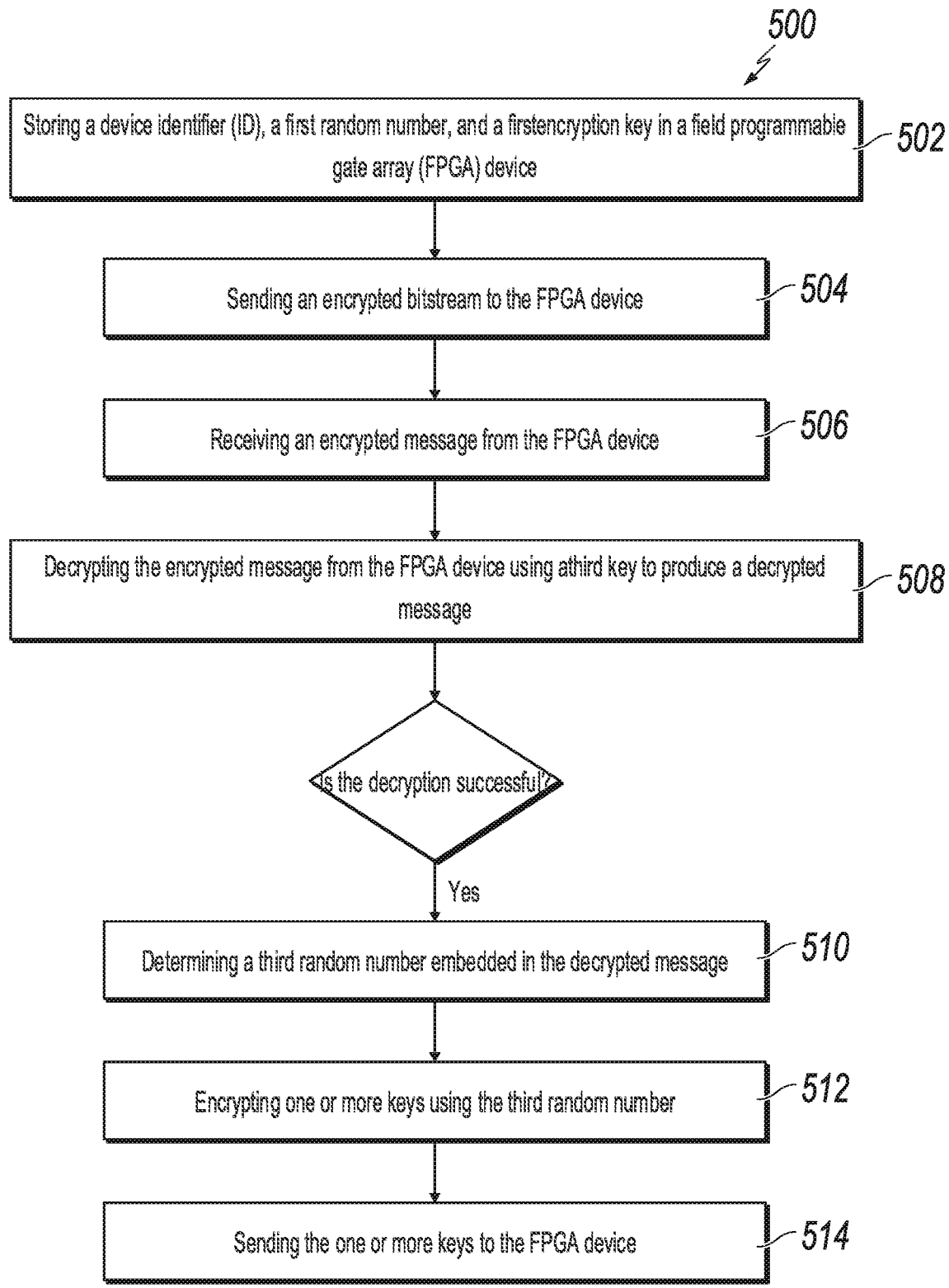
FIG. 5 is a flowchart of an example of a process 500 for implementing an FPGA-based TEE.

FIG. 5 is a flowchart of an example of a process 500 for implementing an FPGA-based TEE. For convenience, the process 500 will be described as being performed by a system of one or more computers, located in one or more locations, and programmed appropriately in accordance with this specification. For example, a blockchain node, e.g., the computing device 106 of FIG. 1, appropriately programmed, can perform the process 500.

As the first step, the server stores a device identifier (ID), a first random number, and a first encryption key in a field programmable gate array (FPGA) device (502). For example, the server can store the information in a one-time programmable area of the FPGA device such as the eFUSE. The FPGA device is communicably coupled to the server, and the device ID is unique to the FPGA device.

Next, the server sends an encrypted bitstream to the FPGA device (504). The encrypted bitstream, if properly decrypted, programs the FPGA device to perform predefined functions. The server can send the encrypted bitstream to the FPGA device via one or more communication channels such as peripheral component interconnect express (PCI-E) lanes.

The FPGA device, in response, decrypts the encrypted bitstream using a bitstream authentication module and the previously-received first encryption key. After successful decryption, the FPGA device loads the decrypted bitstream. A key generation module in the bitstream is programmed to generate a second key using (1) the device ID, (2) the first random number, and (3) a second random number included in the bitstream.

The FPGA device then encrypts a message using the second key. For example, the message can be a concatenation of the device ID and a third random number (device ID H Third random number) using Advanced Encryption Standard-Galois/Counter Mode (AES-GCM).

The server receives the encrypted message from the FPGA device (506).

The server decrypts the encrypted message from the FPGA device using a third key to produce a decrypted message (508). The third key is previously-stored in the server, and should be identical to the second key that is generated by the FPGA device.

In response to successful decryption, the server determines the third random number included in the decrypted message (510). The server can determine the third random number since the server already stores the device ID.

The server next encrypts one or more keys using the third random number (512). For example, the keys can be used by the FPGA device to perform various functions such as attestation service. The server then sends the encrypted keys to the FPGA device (514).

Figure 6:
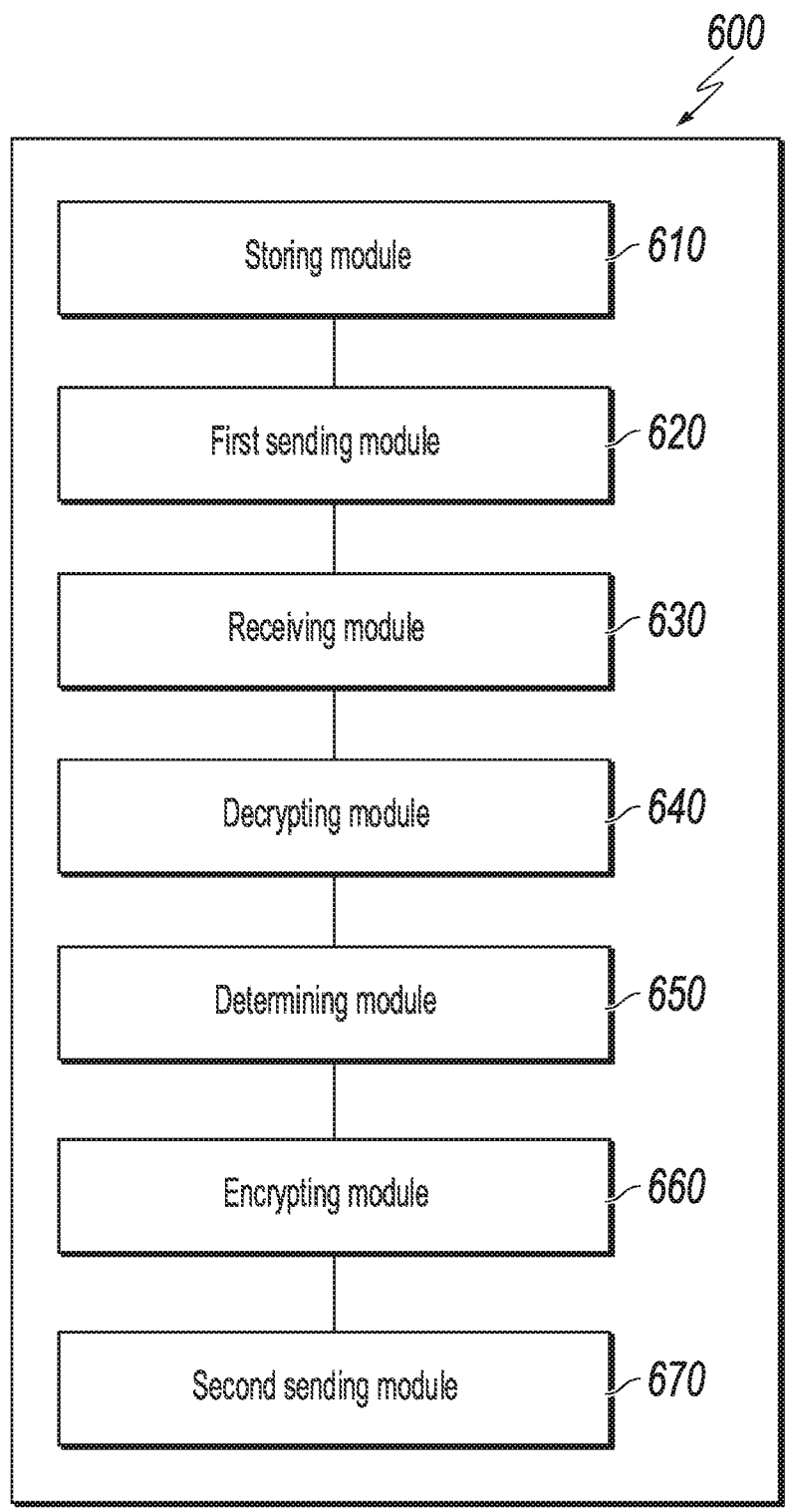
FIG. 6 is a diagram of an example of modules of an apparatus 600 in accordance with embodiments of this specification.

FIG. 6 is a diagram of an example of modules of an apparatus 600 in accordance with embodiments of this specification.

The apparatus 600 can be an example of an embodiment of a blockchain node configured to synchronize data in a blockchain network, wherein the blockchain network is a consortium blockchain network. The apparatus 600 can correspond to embodiments described above, and the apparatus 600 includes the following: a storing module 610 that stores a device identifier (ID), a first random number, and a first encryption key in a field programmable gate array (FPGA) device; a first sending module 620 that sends an encrypted bitstream to the FPGA device, wherein the encrypted bitstream can be decrypted by the first key into a decrypted bitstream comprising a second random number; a receiving module 630 that receives an encrypted message from the FPGA device, wherein the encrypted message is encrypted by the FPGA device using a second key, and wherein the second key is generated by the FPGA device using the device ID, the first random number, and the second random number; a decrypting module 640 that decrypts the encrypted message from the FPGA device using a third key to produce a decrypted message, wherein the third key is stored in the server; a determining module 650 that determines a third random number embedded in the decrypted message; an encrypting module 660 that encrypts one or more keys using the third random number; and a second sending module 670 that sends the one or more keys to the FPGA device.

The techniques described in this specification produce one or more technical effects. For example, in some embodiments, the techniques enable a computing device to create a trust relationship with an FPGA to enable it to serve as a trusted execution environment (TEE). In some embodiments, the techniques enable this trust relationship to be established without involving a certification from the manufacturer of the FPGA. This can lead to increased security, as it can eliminate interaction with an external entity during verification which may be subject to interception or tampering by an attacker.

Described embodiments of the subject matter can include one or more features, alone or in combination. For example, in a first embodiment, a computer-implemented method for configuring a trusted execution environment for use in a blockchain network, comprising: storing, by a blockchain node, a device identifier (ID), a first random number, and a first encryption key in a field programmable gate array (FPGA) device associated with the blockchain node; sending, by the blockchain node, an encrypted bitstream to the FPGA device, wherein the encrypted bitstream can be decrypted by the first key into a decrypted bitstream comprising a second random number; receiving, by the blockchain node, an encrypted message from the FPGA device, wherein the encrypted message is encrypted by the FPGA device using a second key, and wherein the second key is generated by the FPGA device using the device ID, the first random number, and the second random number; decrypting, by the blockchain node, the encrypted message from the FPGA device using a third key to produce a decrypted message, wherein the third key is stored in the server; in response to decrypting the encrypted message using the third key: determining, by the blockchain node, a third random number embedded in the decrypted message; encrypting, by the blockchain node, one or more keys using the third random number; and sending, by the blockchain node, the one or more keys to the FPGA device.

The foregoing and other described embodiments can each, optionally, include one or more of the following features:

A first feature, combinable with any of the following features, specifies that the device ID, the first random number, and the first key are stored in a one-time programmable area of the FPGA device.

A second feature, combinable with any of the previous or following features, specifies that the decrypted bitstream and the second random number are stored in a reprogrammable area of the FPGA device.

A third feature, combinable with any of the previous or following features, specifies that the device ID and the first random number are unique to the FPGA device.

A fourth feature, combinable with any of the previous or following features, specifies that the decrypted message includes the device ID.

A fifth feature, combinable with any of the previous or following features, specifies that the third key is identical to the second key.

A sixth feature, combinable with any of the previous or following features, specifies that the FPGA device decrypts and authenticates the encrypted bitstream using a bitstream authentication module and the first key.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data.

The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for configuring a field programmable gate array (FPGA) based trusted execution environment (TEE) for use in a blockchain network, comprising:
   storing, by a blockchain node in the blockchain network, a device identifier (ID), a first random number, and a first encryption key in an FPGA device associated with the blockchain node;
   sending, by the blockchain node, an encrypted bitstream to the FPGA device, wherein the encrypted bitstream can be decrypted by the FPGA device using the first encryption key into a decrypted bitstream comprising a second random number;
   receiving, by the blockchain node, an encrypted message from the FPGA device, wherein the encrypted message is encrypted by the FPGA device using a second key, and wherein the second key is generated by the FPGA device using the device ID, the first random number, and the second random number;
   decrypting, by the blockchain node, the encrypted message from the FPGA device using a third key to produce a decrypted message, wherein the third key is pre-stored in a server; and
   in response to decrypting the encrypted message using the third key:
      determining, by the blockchain node, a third random number embedded in the decrypted message, encrypting, by the blockchain node, one or more keys using the third random number, and sending, by the blockchain node, the one or more keys to the FPGA device.

2. The method of claim 1, wherein the device ID, the first random number, and the first encryption key are stored in a one-time programmable area of the FPGA device.

3. The method of claim 1, wherein the decrypted bitstream and the second random number are stored in a reprogrammable area of the FPGA device.

4. The method of claim 1, wherein the device ID, and the first random number are unique to the FPGA device.

5. The method of claim 1, wherein the decrypted message includes the device ID.

6. The method of claim 1, wherein the third key is identical to the second key.

7. The method of claim 1, wherein the FPGA device decrypts and authenticates the encrypted bitstream using a bitstream authentication module and the first encryption key.

8. The method of claim 1, further comprising:

in response to sending the one or more keys to the FPGA device, initializing, by the blockchain node, a smart contract virtual machine for execution by the FPGA device.

9. A non-transitory, computer-readable storage medium storing one or more instructions executable by a computer system to perform operations comprising:

storing, by a blockchain node in a blockchain network, a device identifier (ID), a first random number, and a first encryption key in an FPGA device associated with the blockchain node;

sending, by the blockchain node, an encrypted bitstream to the FPGA device, wherein the encrypted bitstream can be decrypted by the FPGA device using the first encryption key into a decrypted bitstream comprising a second random number;

receiving, by the blockchain node, an encrypted message from the FPGA device, wherein the encrypted message is encrypted by the FPGA device using a second key, and wherein the second key is generated by the FPGA device using the device ID, the first random number, and the second random number;

decrypting, by the blockchain node, the encrypted message from the FPGA device using a third key to produce a decrypted message, wherein the third key is pre-stored in a server; and in response to decrypting the encrypted message using the third key:

determining, by the blockchain node, a third random number embedded in the decrypted message, encrypting, by the blockchain node, one or more keys using the third random number, and sending, by the blockchain node, the one or more keys to the FPGA device.

10. The non-transitory, computer-readable storage medium of claim 9, wherein the device ID, the first random number, and the first encryption key are stored in a one-time programmable area of the FPGA device.

11. The non-transitory, computer-readable storage medium of claim 9, wherein the decrypted bitstream and the second random number are stored in a reprogrammable area of the FPGA device.

12. The non-transitory, computer-readable storage medium of claim 9, wherein the device ID, and the first random number are unique to the FPGA device.

13. The non-transitory, computer-readable storage medium of claim 9, wherein the decrypted message includes the device ID.

14. The non-transitory, computer-readable storage medium of claim 9, wherein the third key is identical to the second key.

15. The non-transitory, computer-readable storage medium of claim 9, wherein the FPGA device decrypts and authenticates the encrypted bitstream using a bitstream authentication module and the first encryption key.

16. The non-transitory, computer-readable storage medium of claim 9, wherein the operations further comprise:

in response to sending the one or more keys to the FPGA device, initializing, by the blockchain node, a smart contract virtual machine for execution by the FPGA device.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

storing, by a blockchain node in a blockchain network, a device identifier (ID), a first random number, and a first encryption key in an FPGA device associated with the blockchain node, sending, by the blockchain node, an encrypted bitstream to the FPGA device, wherein the encrypted bitstream can be decrypted by the FPGA device using the first encryption key into a decrypted bitstream comprising a second random number, receiving, by the blockchain node, an encrypted message from the FPGA device, wherein the encrypted message is encrypted by the FPGA device using a second key, and wherein the second key is generated by the FPGA device using the device ID, the first random number, and the second random number, decrypting, by the blockchain node, the encrypted message from the FPGA device using a third key to produce a decrypted message, wherein the third key is pre-stored in a server, and in response to decrypting the encrypted message using the third key:

determining, by the blockchain node, a third random number embedded in the decrypted message, encrypting, by the blockchain node, one or more keys using the third random number, and sending, by the blockchain node, the one or more keys to the FPGA device.

18. The system of claim 17, wherein the device ID, the first random number, and the first encryption key are stored in a one-time programmable area of the FPGA device.

19. The system of claim 17, wherein the decrypted bitstream and the second random number are stored in a reprogrammable area of the FPGA device.

20. The system of claim 17, wherein the device ID, and the first random number are unique to the FPGA device.

21. The system of claim 17, wherein the decrypted message includes the device ID.

22. The system of claim 17, wherein the third key is identical to the second key.

23. The system of claim 17, wherein the FPGA device decrypts and authenticates the encrypted bitstream using a bitstream authentication module and the first encryption key.

24. The system of claim 17, wherein the operations further comprise:
in response to sending the one or more keys to the FPGA device, initializing, by the blockchain node, a smart contract virtual machine for execution by the FPGA device.

\* \* \* \* \*